US009686601B1

(12) United States Patent
Jia

(10) Patent No.: US 9,686,601 B1
(45) Date of Patent: Jun. 20, 2017

(54) COMBINATION MICROPHONE AND STAND

(71) Applicant: Yingzhi Jia, Shenzhen (CN)

(72) Inventor: Yingzhi Jia, Shenzhen (CN)

( * ) Notice: Subject to any disclaimer, the term of this patent is extended or adjusted under 35 U.S.C. 154(b) by 0 days.

(21) Appl. No.: 15/452,025

(22) Filed: Mar. 7, 2017

(51) Int. Cl.
  *H04R 1/08* (2006.01)
  *H04R 1/04* (2006.01)
  *H04R 3/00* (2006.01)
  *H04R 1/28* (2006.01)
  *H04N 5/225* (2006.01)
  *H04N 5/77* (2006.01)

(52) U.S. Cl.
  CPC .......... *H04R 1/083* (2013.01); *H04N 5/2253* (2013.01); *H04N 5/77* (2013.01); *H04R 1/04* (2013.01); *H04R 1/2892* (2013.01); *H04R 3/005* (2013.01)

(58) Field of Classification Search
  CPC .......... H04R 3/005; H04R 1/04; H04R 1/083; H04R 1/2892; H04N 5/2253; H04N 5/77
  USPC .......................................................... 381/91
  See application file for complete search history.

(56) References Cited

U.S. PATENT DOCUMENTS

| 6,953,222 B2 | 10/2005 | Larrick et al. | |
| 2016/0373845 A1* | 12/2016 | Akino | H04R 1/04 |

* cited by examiner

*Primary Examiner* — Paul S Kim
(74) *Attorney, Agent, or Firm* — Adam Bell; Matthew Kaser

(57) ABSTRACT

An audio device that sound enhances, that physically supports the sound enhancing, and that has a capability to physically support a video recorder. The audio device includes a microphone head and a stand. The microphone head enhances sound. The stand physically supports the microphone head and has the capability to physically support the video recorder.

20 Claims, 9 Drawing Sheets

COMBINATION MICROPHONE AND STAND

BACKGROUND OF THE INVENTION

Field of the Invention

The present invention relates to an audio device, and more particularly, to an audio device for supporting a microphone and additionally physically supporting a video recorder in such as to enhance sound quality transduced by the microphone.

Description of the Prior Art

A microphone, colloquially nicknamed mic or mike, is a transducer that converts sound into an electrical signal.

Microphones are used in many applications, such as, telephones, hearing aids, public address systems for concert halls and public events, motion picture production, live and recorded audio engineering, two-way radios, megaphones, radio and television broadcasting, and computers for recording voice, speech recognition, and VoIP, and for non-acoustic purposes, such as, ultrasonic checking or knock sensors.

The sensitive transducer element of a microphone is called its element or capsule. Sound is first converted to mechanical motion by way of a diaphragm, the motion of which is then converted to an electrical signal. A complete microphone also includes a housing, some apparatus for bringing the signal from the element to other equipment, and often an electronic circuit to adapt the output of the capsule to the equipment being driven. A wireless microphone contains a radio transmitter.

Numerous innovations for microphones have been provided in the prior art. Even though these innovations may be suitable for the specific individual purposes to which they address, nevertheless, they differ from the embodiments of the present invention, as hereto described.

SUMMARY OF THE INVENTION

An object of the present invention is to provide an audio device for enhancing the quality of sound transduced by a microphone, and additionally for physically supporting the microphone and also physically supporting a video recorder.

Briefly stated, another object of the embodiments of the present invention is to provide an audio device that improves (enhances) the quality of sound transduced by a microphone coupled to or within the device, and that physically supports the microphone and a video recorder. The device includes a microphone head and a stand. The microphone head design enhances and improves the quality of sound transduced by a microphone.

The novel features considered characteristic of the embodiments of the present invention are set forth in the appended claims. The embodiments of the present invention themselves, however, both as to their construction and to their method of operation together with additional objects and advantages thereof will be best understood from the following description of the embodiments of the present invention when read and understood in connection with the accompanying figures of the drawing.

BRIEF DESCRIPTION OF THE FIGURES OF THE DRAWING

The figures of the drawing are briefly described as follows.

Figure 1:
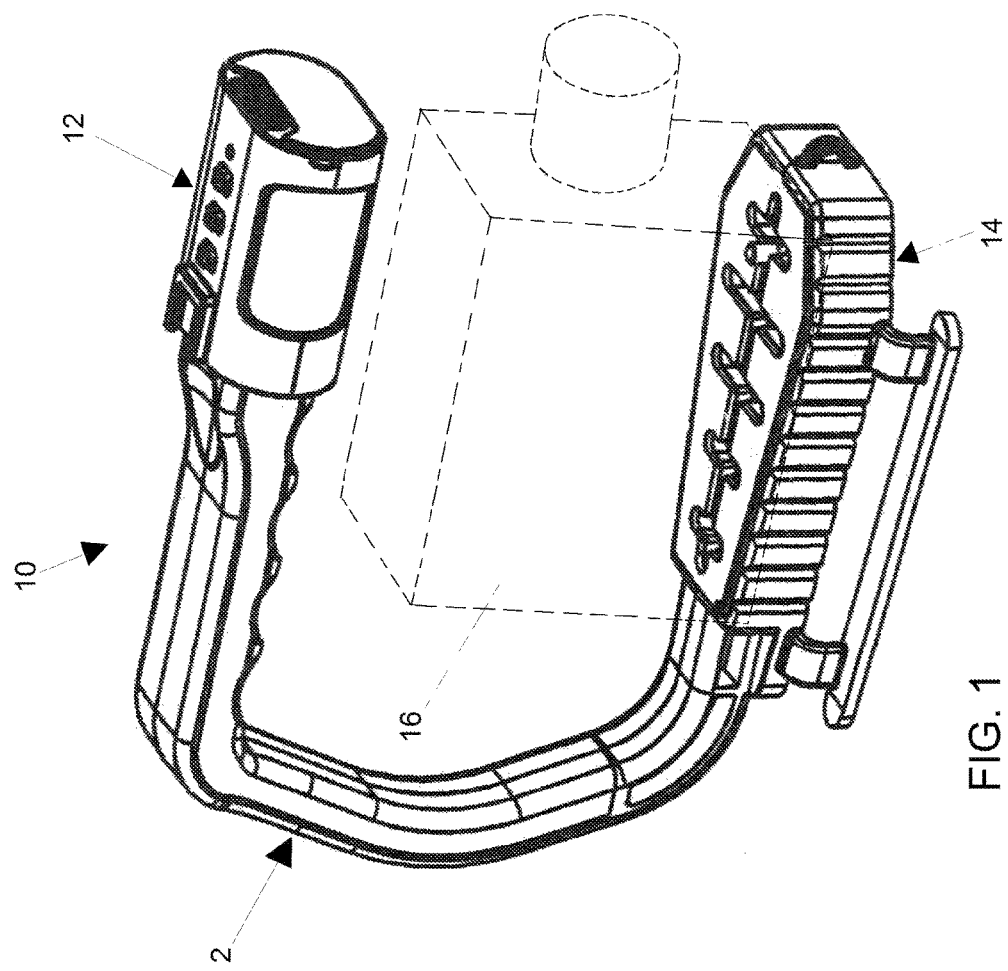
FIG. 1 is a diagrammatic perspective view of the audio device of the embodiments of the present invention sound enhancing, physically supporting the sound enhancing, and physically supporting a video recorder.

LIST OF REFERENCE NUMERALS UTILIZED IN THE FIGURES OF THE DRAWING 10 device of embodiments of present invention for sound enhancing 12, for physically supporting sound enhancing 12, and for having capability 14 for physically supporting video recorder 16
12 sound enhancing
14 capability
16 video recorder

Overall Configuration of Audio Device 10

18 microphone head for sound enhancing 12
20 stand for having capability 14 for physically supporting video recorder 16

Specific Configuration of Microphone head 18 and Stand 20

Stand 20

22 base of stand 20 for resting on support surface 28
24 handle of stand 20
26 neck of stand 20
28 support surface
29 main portion of base 22 of stand 20
30 pair of sides of main portion 29 of base 22 of stand 20
32 top of main portion 29 of base 22 of stand 20
34 bottom of main portion 29 of base 22 of stand 20
35 through bore of main portion 29 of base 22 of stand 20
36 wide anterior portion of main portion 29 of base 22 of stand 20
38 narrow posterior portion of main portion 29 of base 22 of stand 20
40 rubber washer of base 22 of stand 20 for providing cushioning when video recorder 16 rests upon
42 bottom cover of base 22 of stand 20
43 through bore of bottom cover 42 of base 22 of stand 20
44 pair of skids of base 22 of stand 20 for resting upon support surface 28
46 two pair of arcuate supports of base 22 of stand 20
48 pair of rubber pads of base 22 of stand 20 for preventing damage to support surface 28 when pair of skids 44 of base 22 of stand 20 rest thereon
50 thumbscrew fastener of base 22 of stand 20
52 knob of thumbscrew fastener 50 of base 22 of stand 20

54 shaft of thumbscrew fastener 50 of base 22 of stand 20
56 fixed ring of thumbscrew fastener 50 of base 22 of stand 20
58 lower end of handle 24 of stand 20
60 upper end of handle 24 of stand 20
62 narrow back end of neck 26 of stand 20
64 wide front end of neck 26 of stand 20
66 silicone rubber skin of stand 20
68 vertical portion of silicone rubber skin 66 of stand 20 for comfort when audio device 10 is taken hold of
70 horizontal portion of silicone rubber skin 66 of stand 20 for comfort when audio device 10 is taken hold of
72 blind slot of wide front end 64 of neck 26 of stand 20
74 clamp of wide front end 64 of neck 26 of stand 20
76 silicone clip of wide front end 64 of neck 26 of stand 20

Microphone Head 18

78 enclosure of microphone head
80 lower casing shell 80 of enclosure 78 of microphone head 18
82 upper casing shell 82 of enclosure 78 of microphone head 18
84 pair of side mesh casing shells of enclosure 78 of microphone head 18
86 front mesh casing shell of enclosure 78 of microphone head 18
88 four corners of lower casing shell 80 of enclosure 78 of microphone head 18
92 side tabs of four corners 88 of lower casing shell 80 of enclosure 78 of microphone head 18, respectively
94 pair of side spaces of lower casing shell 80 of enclosure 78 of microphone head 18
96 front space of lower casing shell 80 of enclosure 78 of microphone head 18
98 rear end of lower casing shell 80 of enclosure 78 of microphone head 18
100 tab of rear end 98 of lower casing shell 80 of enclosure 78 of microphone head 18
102 battery interface of lower casing shell 80 of enclosure 78 of microphone head 18 for receiving battery 104 for powering audio device 10
104 battery for powering audio device 10
106 four corners of upper casing shell 82 of enclosure 78 of microphone head 18
108 side tabs of four corners 106 of upper casing shell 82 of enclosure 78 of microphone head 18
110 pair of side spaces of upper casing shell 82 of enclosure 78 of microphone head 18
112 front space of upper casing shell 82 of enclosure 78 of microphone head 18
114 rear end of upper casing shell 82 of enclosure 78 of microphone head 18
116 tab of rear end 114 of upper casing shell 82 of enclosure 78 of microphone head 18
118 pair of combination side spaces of enclosure 78 of microphone head 18
120 combination front space of enclosure 78 of microphone head 18
122 combination tab of enclosure 78 of microphone head 18
124 pair of side sponges of enclosure 78 of microphone head 18
126 front sponge of enclosure 78 of microphone head 18
128 silica shock mount of microphone head 18
130 pair of microphones of microphone head 18
132 support plate of microphone head 18
134 silica shock reducing column of microphone head 18
136 motherboard of microphone head 18
138 5 mm cable port of motherboard 136 of microphone head 18
139 three function switches of motherboard 136 of microphone head 18
140 three through bores of upper casing shell 82 of enclosure 78 of microphone head 18
142 three function buttons of upper casing shell 82 of enclosure 78 of microphone head 18

DETAILED DESCRIPTION OF THE PREFERRED EMBODIMENTS

The invention encompasses various embodiments including the following:

A device for enhancing sound quality transduced through a microphone and simultaneously physically supporting a microphone head and a video recorder, said device comprising: a microphone head (18) connected to a neck (20) connected to a handle (24) connected to a base (22) wherein the head (18) is positioned directly above the base (22), wherein the connected head, neck, handle and base define a generally C-shaped structure, and wherein the space between the head (18) and the base (22) defines a void adapted to accommodate a video recorder (16).

The term "enhancing sound quality" refers to improving the clarity and fidelity of sound, for example improving the harmonic range of sound and faithfully and accurately reproducing the tones and musical notes of music or other sounds while minimizing extraneous noise. In the present invention, the improvement in quality when using the device may be a measurable improvement comprising an improvement in Dynamic Range or a reduction in signal-to-noise ratio (SNR) of 1%, 5%, 10%, 20%, 30%, 50%, 70%, 80% or 90% or greater than 90%. Signal-to-noise ratio is defined as the ratio of the power of a signal (meaningful information—the desired sounds to be heard and/or recorded) and the power of background noise (unwanted signal). In one embodiment, the method claimed, by recording an audio signal using the device of the invention, compared to the use of a conventional microphone stand (e.g. and all-metal microphone boom stand with no dampening or spring support, for example a Neewer® NW-210 Mini Microphone Stand), results in an improvement in dynamic range or a reduction in signal-to-noise ratio (SNR) of at least 10% or of at least 20%.

The term "video recorder" includes any physical device that is designed to record video and/or audio signals, on any medium including optical, DAT, DVD, magnetic tape, or any similar medium.

Other embodiments include the device wherein said base is for resting on a support surface and wherein the main portion of said base is coffin-shaped, and as such, has a wide anterior portion; and a narrow posterior portion. In other embodiments the base includes a bottom cover, a thumbscrew fastener. In other embodiments, the handle (24) of the stand is vertically oriented, and as such, has a lower end; and an upper end, and the lower end of the handle can be affixed to a narrow posterior portion of said base. In other embodiments, the handle of the stand extends rearwardly from said narrow posterior portion of said base of said stand and is generally C-shaped for not interfering with the video recorder mounted on said base of said stand, and is for providing a place for a user to grab (with one hand) and hold said handle of said device without interfering with the video recorder. In other embodiments, the neck is horizontally oriented, and as such, has a narrow back end; and a wide front end. In other embodiments, the microphone head includes a silica shock mount that may be contained within said enclosure of said microphone head which may include a pair of microphones. In other embodiments, the microphone head(s) are contained within an enclosure that may be attached to a silica shock mount of said microphone head. In some embodiments, the microphone head includes a silica shock reducing column. And in further key embodiments a microphone head is positioned directly above the base, wherein the connected head, neck, handle and base define a generally C-shaped structure, and wherein the space between the head and the base defines a void adapted to accommodate a video recorder and wherein the shape of the device provides a convenient handle.

Referring now to the figures, in which like numerals indicate like parts, and particularly to FIG. 1, the device of the embodiments of the present invention is shown generally including elements for supporting a microphone and enhancing sound quality, for physically supporting the sound enhancing elements 12, and for having a capability 14 for physically supporting a video recorder 16.

Overall Configuration of the Audio Device 10

Figure 2:
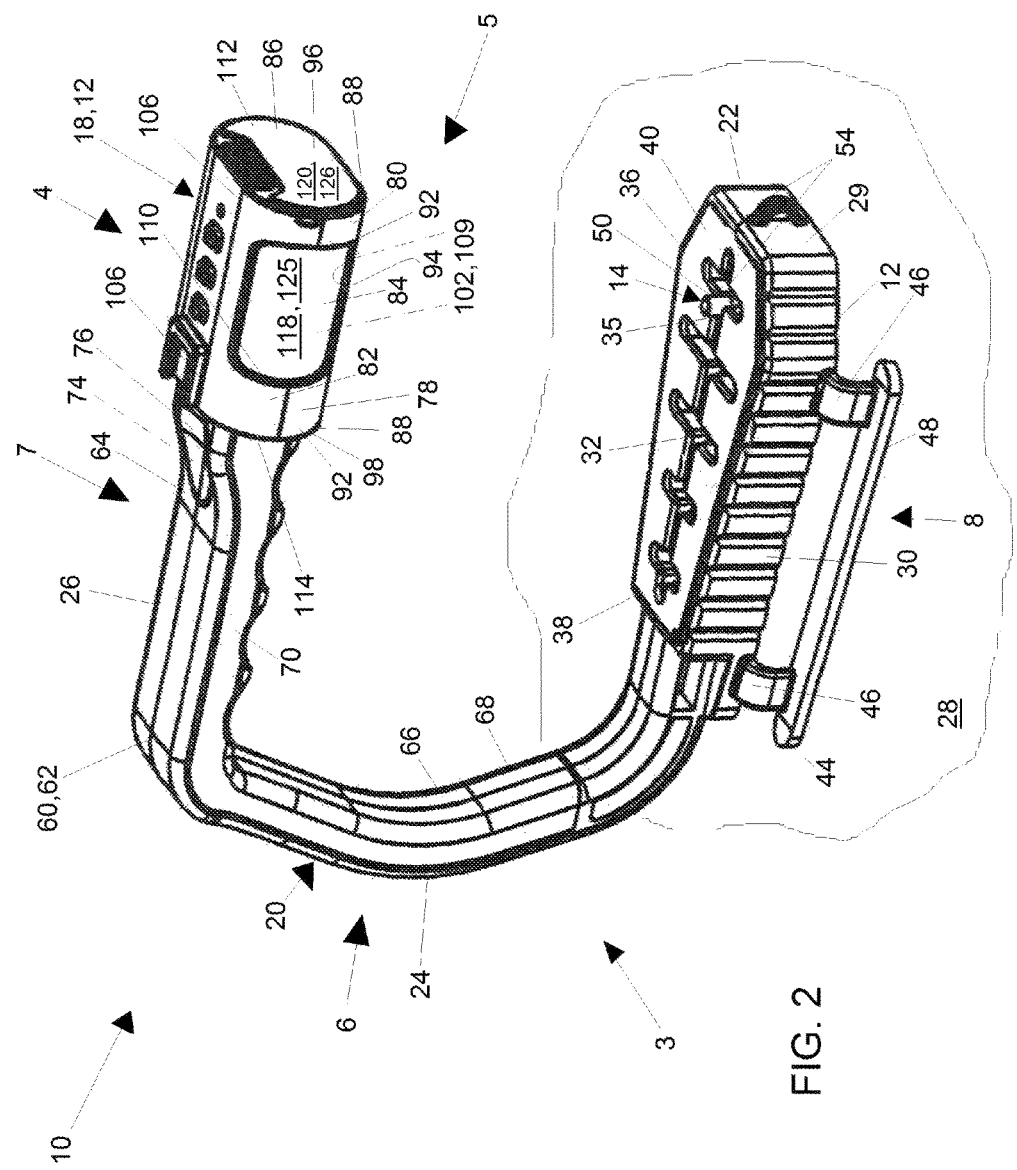
FIG. 2 is diagrammatic perspective view of the audio device of the embodiments of the present invention identified by ARROW 2 in FIG. 1.
Figure 3:
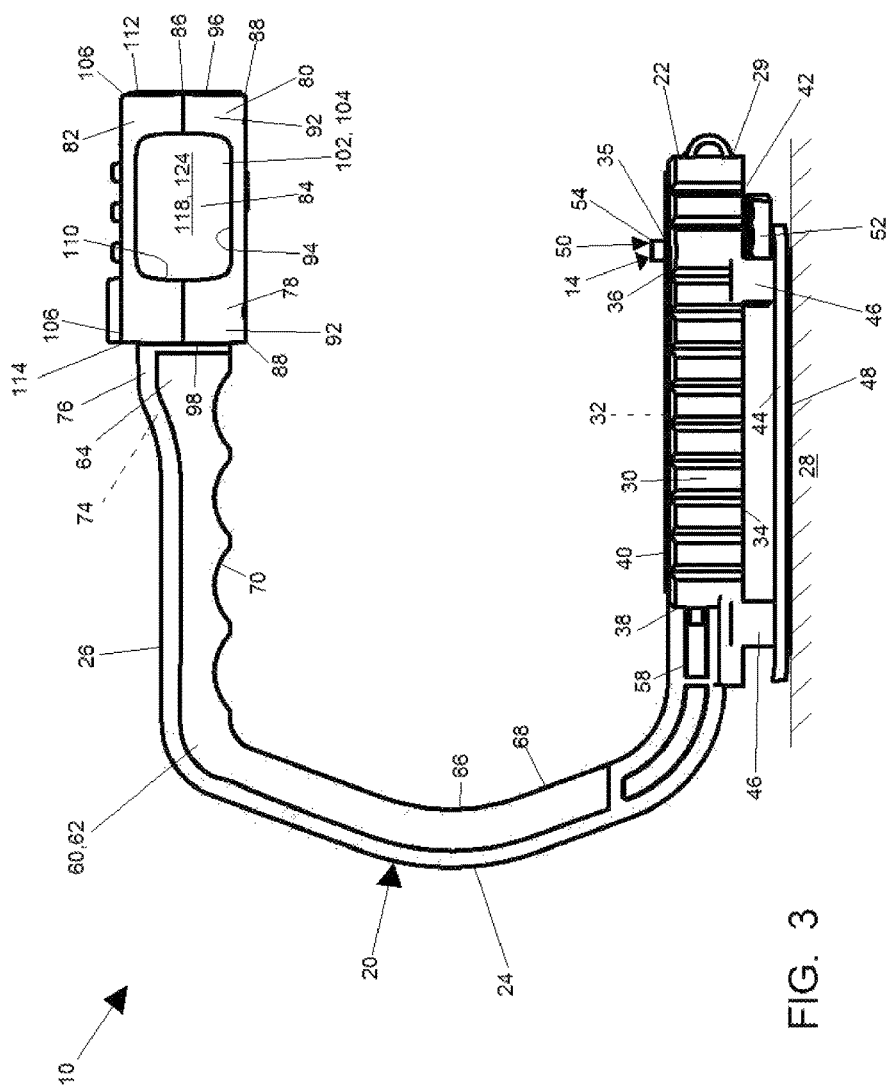
FIG. 3 is a diagrammatic right side elevational view taken in the direction of ARROW 3 in FIG. 2.
Figure 4:
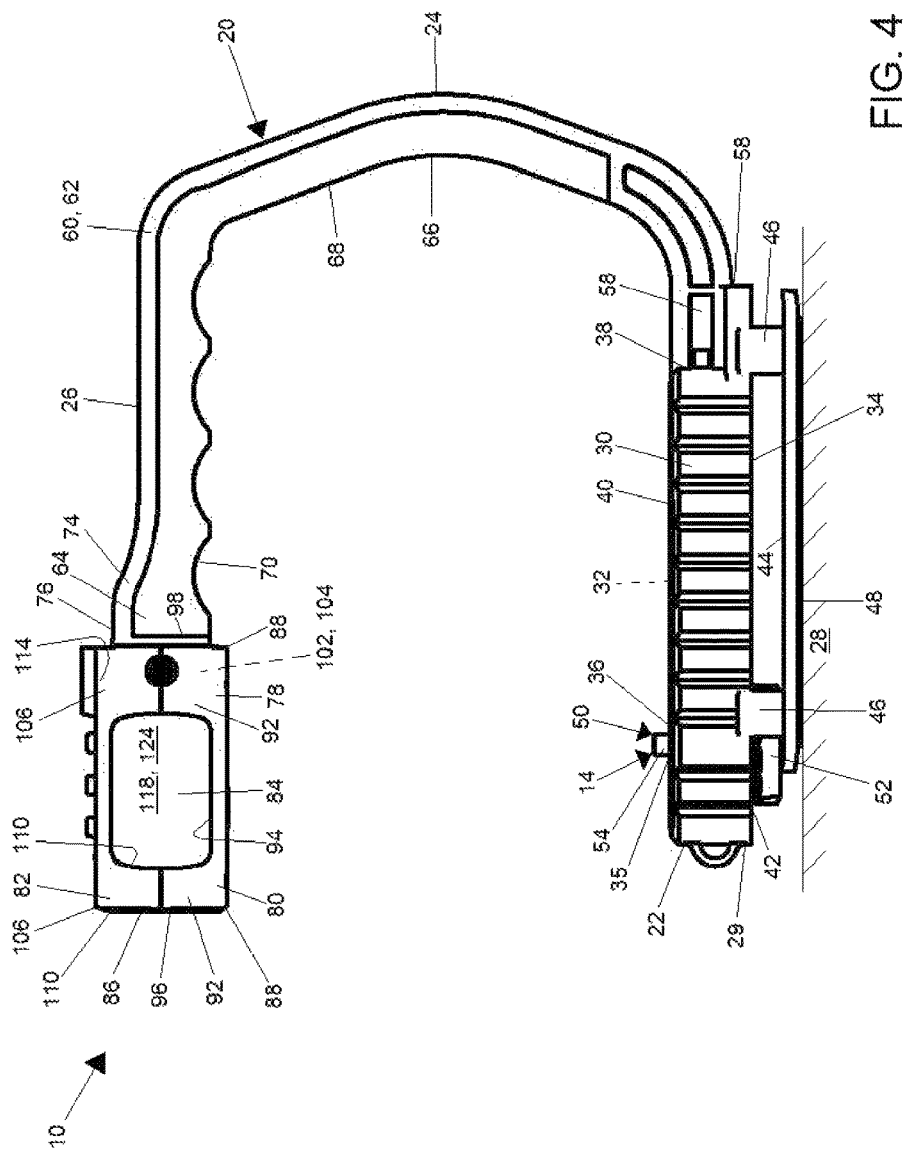
FIG. 4 is a diagrammatic left side elevational view taken in the direction of ARROW 4 in FIG. 2.
Figure 5:
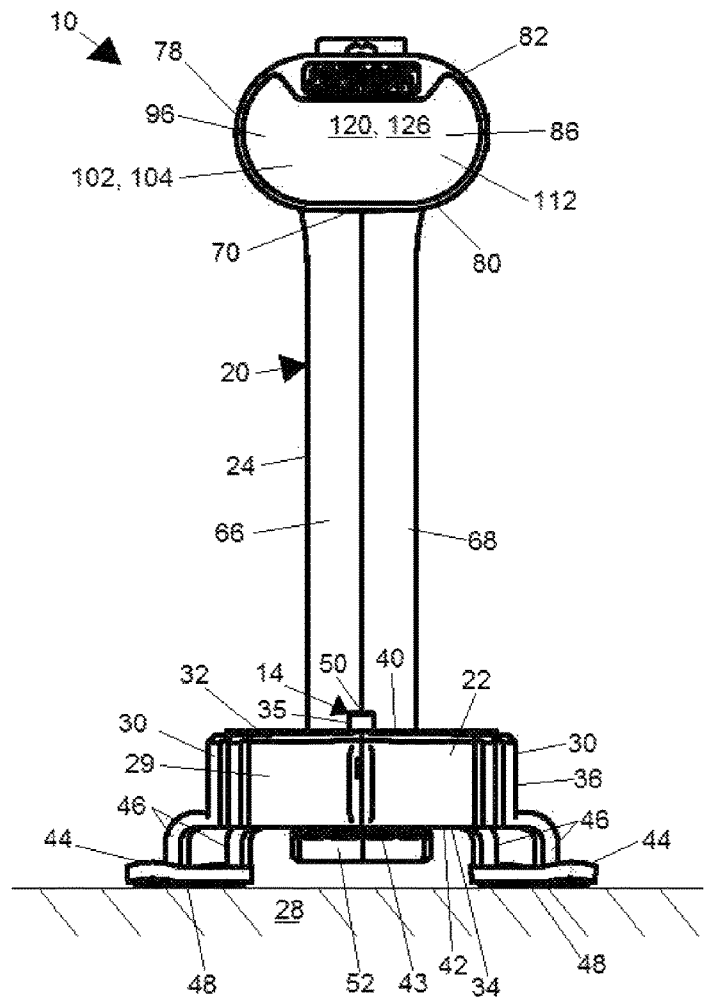
FIG. 5 is a diagrammatic front end view taken in the direction of ARROW 5 in FIG. 2.
Figure 6:
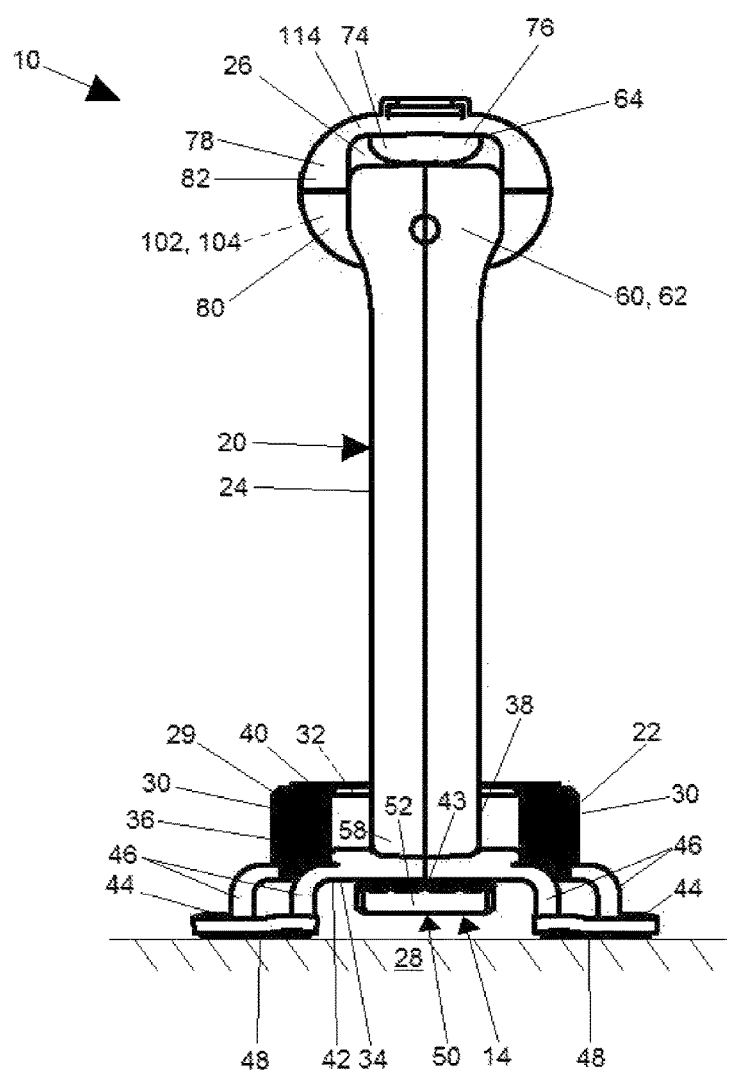
FIG. 6 is a diagrammatic rear end view taken in the direction of ARROW 6 in FIG. 2.
Figure 7:
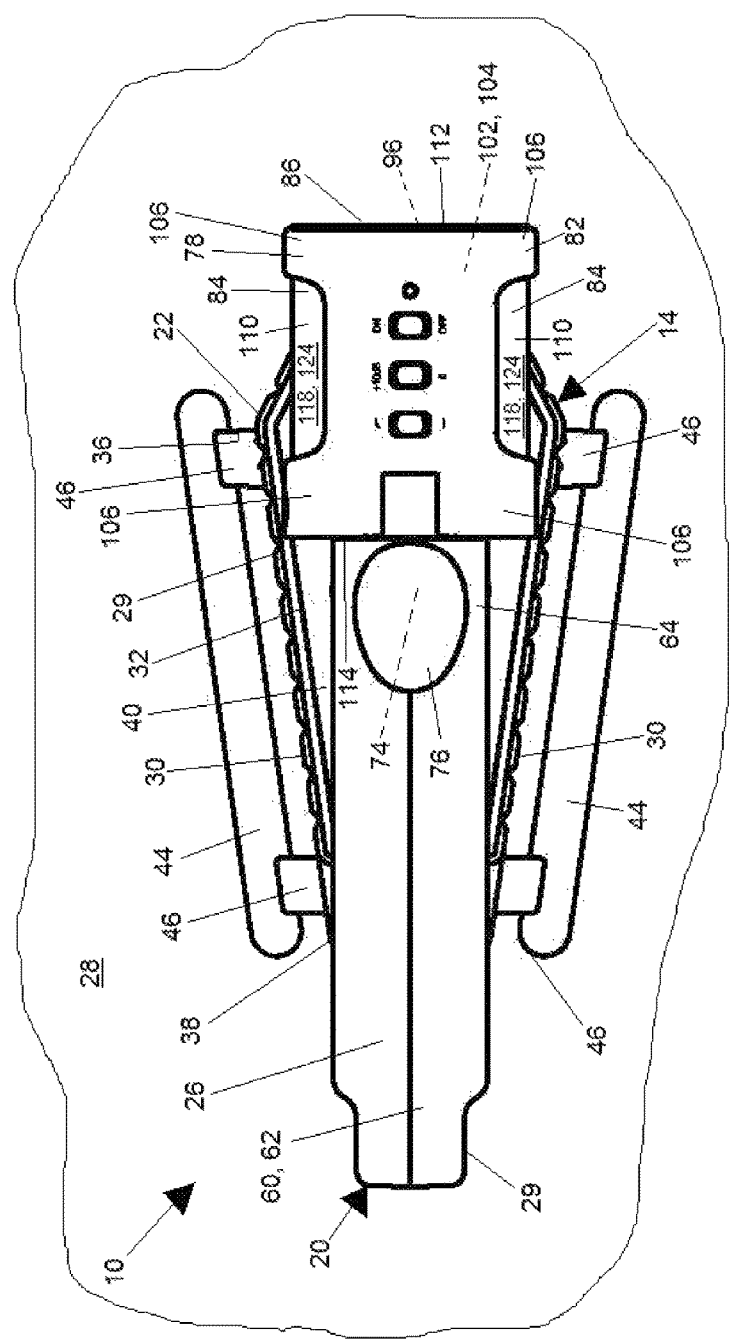
FIG. 7 is a diagrammatic top plan view taken in the direction of ARROW 7 in FIG. 2.
Figure 8:
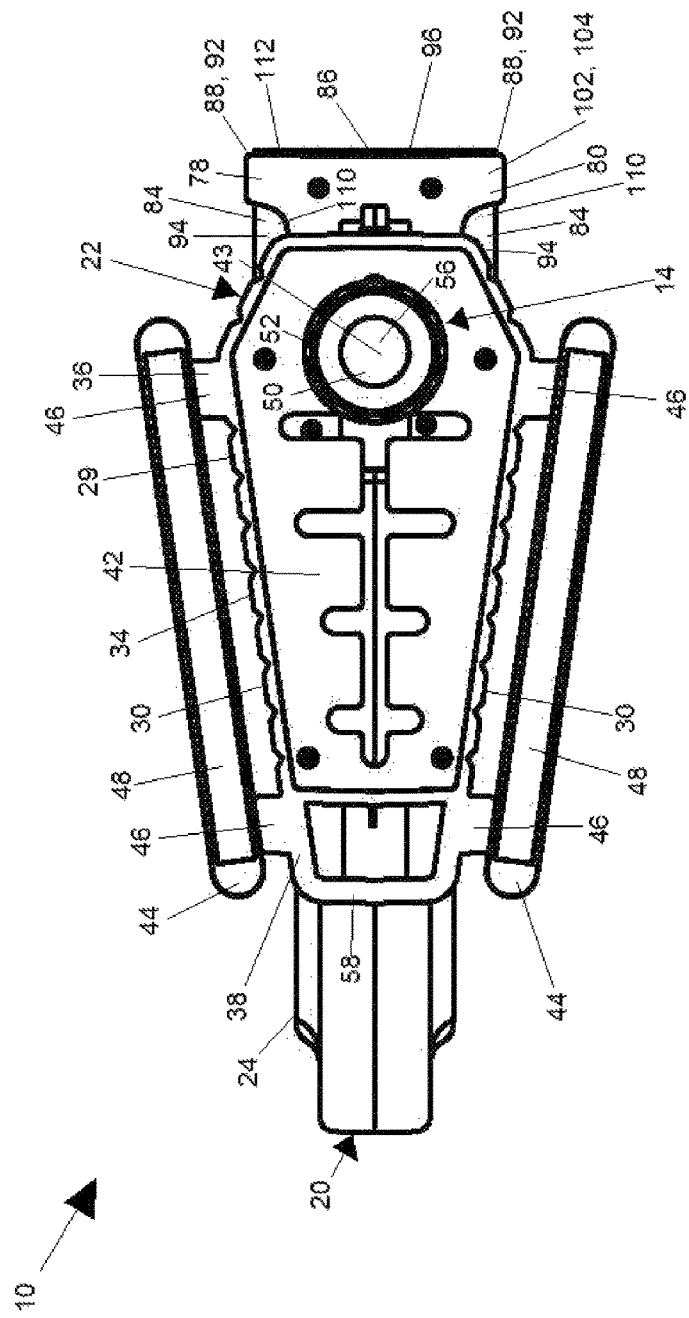
FIG. 8 is a diagrammatic bottom plan view taken in the direction of ARROW 8 in FIG. 2.
Figure 9:
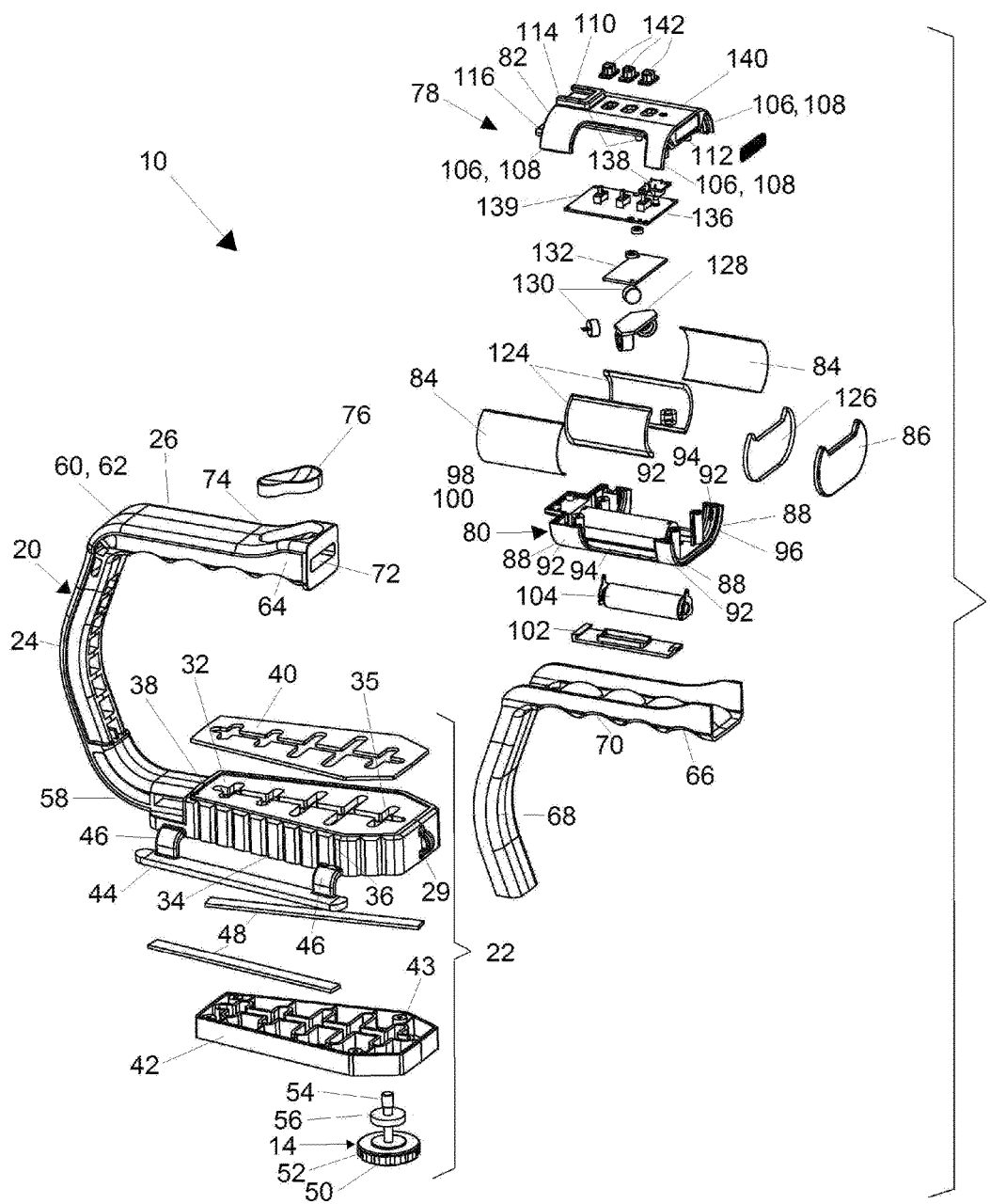
FIG. 9 is an exploded diagrammatic perspective view of the audio device of FIG. 2.

The overall configuration of the audio device 10 can best be seen in FIG. 2, and as such, will be discussed with reference thereto.

The audio device 10 comprises a microphone head 18 and a stand 20. The microphone head 18 is for the sound enhancing 12. The stand 20 physically supports the microphone head 18 and physically supporting the video recorder 16.

Specific Configuration of the Microphone Head 18 and the Stand 20

The specific configuration of the microphone head 18 and the stand 20 can best be seen in FIGS. 2-9, and as such, will be discussed with reference thereto.

Stand 20

The stand 20 comprises a base 22, a handle 24, and a neck 26.

The base 22 of the stand 20 is for resting on a support surface 28, and includes a main portion 29.

The main portion 29 of the base 22 of the stand 20 has a pair of sides 30, a top 32, a bottom 34, and a through bore 35, and is coffin-shaped, and as such, has a wide anterior portion 36 and a narrow posterior portion 38.

The through bore 35 of the main portion 29 of the base 22 of the stand 20 extends vertically through the wide anterior portion 36 of the main portion 29 of the base 22 of the stand 20.

The base 22 of the stand 20 further includes a rubber washer 40. The rubber washer 40 of the base 22 of the stand 20 rests upon the top 32 of the main portion 29 of the base 22 of the stand 20 and is for providing a cushion for the video recorder 16 to rest upon.

The base 22 of the stand 20 further includes a bottom cover 42. The bottom cover 42 of the base 22 of the stand 20 closes off the bottom 34 of the main portion 29 of the base 22 of the stand 20.

The bottom cover 42 of the base 22 of the stand 20 has a through bore 43. The through bore 43 of the bottom cover 42 of the base 22 of the stand 20 extends vertically through the bottom cover 42 of the base 22 of the stand 20, and is in alignment with the through bore 35 of the main portion 29 of the base 22 of the stand 20 so as to form a combination through bore.

The base 22 of the stand 20 further includes a pair of skids 44. The pair of skids 44 of the base 22 of the stand 20 are slender, elongated, and flat, and are for resting upon the support surface 28.

The pair of skids 44 of the base 22 of the stand 20 extend outwardly and downwardly away from the pair of sides 30 of the main portion 29 of the base 22 of the stand 20, respectively, and are attached to the pair of sides 30 of the main portion 29 of the base 22 of the stand 20, respectively, via two pair of arcuate supports 46, respectively, disposed in proximity to the bottom 34 of the main portion 29 of the base 22 of the stand 20.

The base 22 of the stand 20 further includes a pair of rubber pads 48. The pair of rubber pads 48 of the base 22 of the stand 20 are shaped as, and are attached underneath to, the pair of skids 44 of the base 22 of the stand 20, respectively, and are for preventing damage to the support surface 28 when the pair of skids 44 of the base 22 of the stand 20 rest thereon.

The base 22 of the stand 20 further includes a thumbscrew fastener 50. The thumbscrew fastener 50 of the base 22 of the stand 20 is a type of screw drive with either a tall head and ridged or knurled sides, or a key-like flat sided vertical head, and has a knurled perimeter for finger grip. The thumbscrew fastener 50 of the base 22 of the stand 20 is intended to be tightened and loosened by hand.

The thumbscrew fastener 50 of the base 22 of the stand 20 has a knob 52, a shaft 54, and a fixed ring 56.

The shaft 54 of the thumbscrew fastener 50 of the base 22 of the stand 20 extends upwardly from the knob 52 of the thumbscrew fastener 50 of the base 22 of the stand 20, through the combination through bore of the base 22 of the stand 20, from the bottom cover 42 of the base 22 of the stand 20, and is for threading into, and affixing, the video recorder 16. The fixed ring 56 of the thumbscrew fastener 50 of the base 22 of the stand 20 is on the shaft 54 of the thumbscrew fastener 50 of the base 22 of the stand 20.

The handle 24 of the stand 20 is vertically oriented, and as such, has a lower end 58 and an upper end 60.

The lower end 58 of the handle 24 of the stand 20 is affixed to the narrow posterior portion 38 of the base 22 of the stand 20, and the handle 24 of the stand 20 extends rearwardly therefrom.

The handle 24 of the stand 20 is generally C-shaped for not interfering with the video recorder 16 mounted on the base 22 of the stand 20, and is for providing a place for a user to grab the audio device 10 for moving without interfering with the video recorder 16.

The neck 26 of the stand 20 is horizontally oriented, and as such, has a narrow back end 62 and a wide front end 64.

The narrow back end 62 of the neck 26 of the stand 20 is affixed to the upper end 60 of the handle 24 of the stand 20, and the neck 26 of the stand 20 extends forwardly therefrom.

The stand 20 further comprises a silicone rubber skin 66. The silicone rubber skin 66 of the stand 20 has a vertical portion 68 and a horizontal portion 70.

The vertical portion 68 of the silicone rubber skin 66 of the stand 20 closes off the handle 24 of the stand 20 for comfort when the audio device 10 is taken hold of.

The horizontal portion 70 of the silicone rubber skin 66 of the stand 20 closes off the neck 26 of the stand 20 for comfort when the audio device 10 is taken hold of.

The wide front end 64 of the neck 26 of the stand 20 has a blind slot 72. The blind slot 72 of the wide front end 64 of the neck 26 of the stand 20 is horizontally oriented, and receives a portion of the microphone head 18.

The wide front end 64 of the neck 26 of the stand 20 further has a clamp 74. The clamp 74 of the wide front end 64 of the neck 26 of the stand 20 extends rotatably from outside the wide front end 64 of the neck 26 of the stand 20 and into the blind slot 72 of the wide front end 64 of the neck 26 of the stand 20, to thereby engage the portion of the microphone head 18.

The wide front end 64 of the neck 26 of the stand 20 further has a silicone clip 76. The silicone clip 76 of the wide front end 64 of the neck 26 of the stand 20 covers the clamp 74 of the wide front end 64 of the neck 26 of the stand 20.

Microphone Head 18

The microphone head 18 comprises an enclosure 78. The enclosure 78 of the microphone head 18 includes a lower casing shell 80, an upper casing shell 82, a pair of side mesh casing shells 84, and a front mesh casing shell 86.

The lower casing shell 80 of the enclosure 78 of the microphone head 18 is generally semi-cylindrically shaped, opens upwardly, and has four corners 88. The four corners 88 of the lower casing shell 80 of the enclosure 78 of the microphone head 18 have side tabs 92 extending upwardly therefrom, to thereby provide a pair of side spaces 94 therebetween and a front space 96 therebetween.

A rear end 98 of the lower casing shell 80 of the enclosure 78 of the microphone head 18 has a tab 100. The tab 100 of the rear end 98 of the lower casing shell 80 of the enclosure 78 of the microphone head 18 is horizontally oriented.

The lower casing shell 80 of the enclosure 78 of the microphone head 18 contains a battery interface 102. The battery interface 102 of the microphone head 18 is for receiving a battery 104 for powering the audio device 10.

The upper casing shell 82 of the enclosure 78 of the microphone head 18 is generally semi-cylindrically shaped, opens downwardly, and has four corners 106. The four corners 106 of the upper casing shell 82 of the enclosure 78 of the microphone head 18 have side tabs 108 extending downwardly therefrom, to thereby provide a pair of side spaces 110 therebetween and a front space 112 therebetween.

A rear end 114 of the upper casing shell 82 of the enclosure 78 of the microphone head 18 has a tab 116. The tab 116 of the rear end 114 of the upper casing shell 82 of the enclosure 78 of the microphone head 18 is horizontally oriented.

The upper casing shell 82 of the enclosure 78 of the microphone head 18 is disposed above the lower casing shell 80 of the enclosure 78 of the microphone head 18.

The side tabs 108 of the four corners 106 of the upper casing shell 82 of the enclosure 78 of the microphone head 18 contact respective ones of the side tabs 92 of the four corners 88 of the lower casing shell 80 of the enclosure 78 of the microphone head 18.

The pair of side spaces 94 of the lower casing shell 80 of the enclosure 78 of the microphone head 18 communicate with the pair of side spaces 110 of the upper casing shell 82 of the enclosure 78 of the microphone head 18, respectively, so as to form a pair of combination side spaces 118.

The front space 96 of the lower casing shell 80 of the enclosure 78 of the microphone head 18 communicates with the front space 112 of the upper casing shell 82 of the enclosure 78 of the microphone head 18 so as to form a combination front space 120.

The tab 116 of the ear end 114 of the upper casing shell 82 of the enclosure 78 of the microphone head 18 contacts the tab 100 of the rear end 98 of the lower casing shell 80 of the enclosure 78 of the microphone head 18 so as to form a combination tab 122.

The combination tab 122 of the enclosure 78 of the microphone head 18 is received in the blind slot 72 of the wide front end 64 of the neck 26 of the stand 20.

The pair of combination side spaces 118 of the enclosure 78 of the microphone head 18 are filled by the pair of side mesh casing shells 84 of the enclosure 78 of the microphone head 18, respectively.

The combination front space 120 of the enclosure 78 of the microphone head 18 is filled by the front mesh casing shell 86 of the enclosure 78 of the microphone head 18.

The pair of side mesh casing shells 84 of the enclosure 78 of the microphone head 18 are lined with a pair of side sponges 124, respectively, for absorbing sound of air moving across the mic so that it is not picked up and does not create a static-like sound.

The front mesh casing shell 86 of the enclosure 78 of the microphone head 18 is lined with a front sponge 126 for absorbing sound of air moving across the mic so that it is not picked up and does not create a static-like sound.

The microphone head 18 further includes a silica shock mount 128. The silica shock mount 128 of the microphone head 18 is contained within the enclosure 78 of the microphone head 18.

The microphone head 18 further includes a pair of microphones 130. The pair of microphones 130 of the microphone head 18 are contained within the enclosure 78 of the microphone head 18, and are attached to the silica shock mount 128 of the microphone head 18.

The microphone head 18 further includes a support plate 132. The support plate 132 of the microphone head 18 is contained within the enclosure 78 of the microphone head 18, and is disposed above the silica shock mount 128 of the microphone head 18.

The microphone head 18 further includes a silica shock reducing column 134. The silica shock reducing column 134 of the microphone head 18 is contained within the enclosure 78 of the microphone head 18, and rests on the support plate 132 of the microphone head 18.

The microphone head 18 further includes a motherboard 136. The motherboard 136 of the microphone head 18 is contained within the enclosure 78 of the microphone head 18, and rests on the silica shock reducing column 134 of the microphone head 18.

The motherboard 136 of the microphone head 18 is in electrical communication with the battery interface 102 of the microphone head 18, and includes a 5 mm cable port 138 and three function switches 139.

A motherboard is the main printed circuit board (PCB) found in systems. It holds, and allows, communication between many of the crucial electronic components of a system, such as, the central processing unit (CPU) and the memory, and provides connectors for other peripherals. Unlike a backplane, a motherboard usually contains significant sub-systems, such as, the central processor, the chipset's input/output and memory controllers, interface connectors, and other components integrated for general purpose use.

The upper casing shell 82 of the enclosure 78 of the microphone head 18 includes three through bores 140 and three function buttons 142.

The three function buttons 142 of the upper casing shell 82 of the enclosure 78 of the microphone head 18 extend movably in the three through bores 140 of the upper casing shell 82 of the enclosure 78 of the microphone head 18, respectively, and communicate with, so as to activate when pressed, the three function switches 139 of the motherboard 136 of the microphone head 18, respectively.

GENERAL DISCLOSURES

It will be understood that each of the elements described above, or two or more together, may also find a useful application in other types of constructions differing from the types described above.

While the embodiments of the present invention have been illustrated and described as embodied in an audio device for sound enhancing, for physically supporting the sound enhancing, and for having a capability for physically supporting a video recorder, nevertheless, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis, the foregoing will so fully reveal the gist of the embodiments of the present invention that others can by applying current knowledge readily adapt them for various applications without omitting features that from the standpoint of prior art fairly constitute characteristics of the generic or specific aspects of the embodiments of the present invention.

The invention claimed is:

1. A device for enhancing sound quality transduced through a microphone and simultaneously physically supporting a microphone head and a video recorder, said audio device comprising:
    a microphone head (18) connected to a neck (20) connected to a handle (24) connected to a base (22);
    wherein the base functions as a docking station for a video or sound recorder;
    wherein the head (18) is positioned directly above the base (22);
    wherein the connected head, neck, handle and base define a generally C-shaped structure; and
    wherein the space between the head (18) and the base (22) defines a void adapted to accommodate a video or sound recorder (16).

2. The device of claim 1 wherein said base is for resting on a support surface and wherein the main portion of said base is coffin-shaped, and as such, has a wide anterior portion; and a narrow posterior portion.

3. The device of claim 2, wherein said base includes a bottom cover.

4. The audio device of claim 3, wherein said base includes a thumbscrew fastener.

5. The audio device of claim 4, wherein said thumbscrew fastener of said base has: a knob; a shaft; and a fixed ring.

6. The device of claim 5, wherein said shaft of said thumbscrew fastener of said base extends upwardly from said knob of said thumbscrew fastener of said base of said stand, through said combination through bore of said base of said stand, from said bottom cover of said base of said stand, and is for threading into, and affixing, the video recorder; and wherein said fixed ring of said thumbscrew fastener of said base is disposed on said shaft of said thumbscrew fastener of said base.

7. The device of claim 1, wherein said handle (24) of said stand is vertically oriented, and as such, has a lower end; and an upper end.

8. The device of claim 7, wherein said lower end of said handle of said stand is affixed to a narrow posterior portion of said base.

9. The device of claim 8, wherein said handle of said stand extends rearwardly from said narrow posterior portion of said base of said stand.

10. The device of claim 8, wherein said handle of said stand is generally C-shaped for not interfering with the video recorder mounted on said base of said stand, and is for providing a place for a user to grab and hold said handle of said device without interfering with the video recorder.

11. The device of claim 8, wherein said neck of said stand is horizontally oriented, and as such, has a narrow back end; and a wide front end.

12. The device of claim 1, wherein said microphone head includes a silica shock mount.

13. The device of claim 12, wherein said silica shock mount of said microphone head is contained within said enclosure of said microphone head.

14. The device of claim 12, wherein said microphone head includes a pair of microphones.

15. The device of claim 14, wherein said pair of microphones of said microphone head are contained within said enclosure of said microphone head; and
    wherein said pair of microphones of said microphone head are attached to said silica shock mount of said microphone head.

16. The device of claim 14, wherein said microphone head includes a silica shock reducing column.

17. A method for enhancing sound quality transduced through a microphone and simultaneously physically supporting a microphone head and a video recorder, the method comprising providing a device, the device comprising:
    a microphone head (18) connected to a neck (20) connected to a handle (24) connected to a base (22);
    wherein the base functions as a docking station for a video or sound recorder;
    wherein the head (18) is positioned directly above the base (22);
    wherein the connected head, neck, handle and base define a generally C-shaped structure;
    wherein the space between the head (18) and the base (22) accommodates a video or sound recorder which is functionally attached to the microphone (16); and
    recording sounds using the microphone and recorder.

18. The method of claim 17 further comprising recording video images.

19. The method of claim 17 wherein video or sound recorder employs a medium selected from the group consisting of: optical, DAT, DVD, and magnetic tape.

20. The method of claim 17 wherein the use of the device compared to the use of a conventional undamped metal microphone boom stand, results in an improvement in dynamic range or a reduction in signal-to-noise ratio (SNR) of at least 10%.

* * * * *